(12) United States Patent
Sato et al.

(10) Patent No.: US 11,065,790 B2
(45) Date of Patent: Jul. 20, 2021

(54) FLUORINATED COPOLYMER COMPOSITION, METHOD FOR ITS PRODUCTION, AND MOLDED PRODUCT

(71) Applicant: AGC Inc., Chiyoda-ku (JP)

(72) Inventors: Takashi Sato, Chiyoda-ku (JP); Tomoya Hosoda, Chiyoda-ku (JP); Tatsuya Terada, Chiyoda-ku (JP); Masatoshi Abe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 29 days.

(21) Appl. No.: 16/169,247

(22) Filed: Oct. 24, 2018

(65) Prior Publication Data

US 2019/0055390 A1    Feb. 21, 2019

Related U.S. Application Data

(63) Continuation of application No. PCT/JP2017/016436, filed on Apr. 25, 2017.

(30) Foreign Application Priority Data

Apr. 28, 2016  (JP) .............................. JP2016-091886
Sep. 2, 2016   (JP) .............................. JP2016-172023

(51) Int. Cl.

| | |
|---|---|
| B29C 45/00 | (2006.01) |
| B29C 48/00 | (2019.01) |
| B29C 48/08 | (2019.01) |
| B29C 48/305 | (2019.01) |
| B29C 48/92 | (2019.01) |
| C08L 87/00 | (2006.01) |
| C08L 71/00 | (2006.01) |
| C08G 75/23 | (2006.01) |
| C08J 5/04 | (2006.01) |
| C08L 71/10 | (2006.01) |
| C08J 3/00 | (2006.01) |
| C08J 5/18 | (2006.01) |
| C08G 65/40 | (2006.01) |
| C08J 5/24 | (2006.01) |
| C08L 27/16 | (2006.01) |
| C08L 27/18 | (2006.01) |
| C08L 27/20 | (2006.01) |
| C08L 67/02 | (2006.01) |
| C08L 77/00 | (2006.01) |
| C08L 81/06 | (2006.01) |

(Continued)

(52) U.S. Cl.
CPC ........ B29C 45/0005 (2013.01); B29C 48/022 (2019.02); B29C 48/08 (2019.02); B29C 48/305 (2019.02); B29C 48/92 (2019.02); C08G 65/40 (2013.01); C08G 75/23 (2013.01); C08J 3/005 (2013.01); C08J 5/04 (2013.01); C08J 5/18 (2013.01); C08J 5/24 (2013.01); C08L 27/16 (2013.01); C08L 27/18 (2013.01); C08L 27/20 (2013.01); C08L 67/025 (2013.01); C08L 71/00 (2013.01); C08L 71/10 (2013.01); C08L 77/00 (2013.01); C08L 81/06 (2013.01); C08L 87/00 (2013.01); B29C 48/10 (2019.02); B29C 48/16 (2019.02); B29C 48/40 (2019.02); B29K 2027/16 (2013.01); B29K 2027/18 (2013.01); B29K 2071/00 (2013.01); B29L 2031/045 (2013.01); B29L 2031/16 (2013.01); B29L 2031/3076 (2013.01); C08G 2650/40 (2013.01); C08J 2371/00 (2013.01); C08J 2381/06 (2013.01); C08J 2427/12 (2013.01)

(58) Field of Classification Search
CPC .......... C08L 71/00; C08L 71/08; C08L 71/10; C08L 61/00; C08L 61/16; C08L 61/34; C08L 27/12–20
See application file for complete search history.

(56) References Cited

U.S. PATENT DOCUMENTS 4,395,512 A * 7/1983 Kubota ................... C08L 81/02
                                                524/413
4,777,214 A * 10/1988 Petersen ................. C08L 23/14
                                                525/146

(Continued)

FOREIGN PATENT DOCUMENTS

| JP | 2-132156 | 5/1990 |
| JP | 7-26144 | 1/1995 |

(Continued)

OTHER PUBLICATIONS

International Search Report dated Aug. 8, 2017 in PCT/JP2017/016436, filed on Apr. 25, 2017 (with English Translation).

(Continued)

Primary Examiner — Ana L. Woodward
(74) Attorney, Agent, or Firm — Oblon, McClelland, Maier & Neustadt, L.L.P.

(57) ABSTRACT

To provide a fluorinated copolymer composition having improved impact resistance and excellent moldability without impairing the excellent heat resistance and mechanical properties inherent to a thermoplastic heat-resistant resin. This fluorinated copolymer composition comprises a thermoplastic resin A being a melt-moldable heat-resistant thermoplastic resin and a fluorinated elastomer B being a fluorinated elastic copolymer, wherein the fluorinated elastomer B is dispersed in the thermoplastic resin A, the number average particle diameter of the fluorinated elastomer B is from 1 to 300 μm, the volume ratio of the thermoplastic resin A to the fluorinated elastomer B is from 97:3 to 55:45, and the fluorinated copolymer composition has a flexural modulus of from 1,000 to 3,700 MPa.

19 Claims, No Drawings

(51) Int. Cl.
- *B29C 48/10* (2019.01)
- *B29C 48/40* (2019.01)
- *B29C 48/16* (2019.01)
- *B29K 27/00* (2006.01)
- *B29K 27/18* (2006.01)
- *B29K 71/00* (2006.01)
- *B29L 31/04* (2006.01)
- *B29L 31/16* (2006.01)
- *B29L 31/30* (2006.01)

(56) References Cited

U.S. PATENT DOCUMENTS

| | | |
|---|---|---|
| 6,121,171 A | 9/2000 | Takahashi et al. |
| 2015/0259525 A1 | 9/2015 | Mutsuda et al. |
| 2016/0046806 A1 | 2/2016 | Akashi et al. |

FOREIGN PATENT DOCUMENTS

| | | |
|---|---|---|
| JP | 10-338809 | 12/1998 |
| JP | 11-158340 | 6/1999 |
| JP | 2006-274073 | 10/2006 |
| JP | 2012/005133 | 1/2012 |
| JP | WO2014/034493 A1 | 3/2014 |
| JP | 2014-95034 | 5/2014 |
| JP | WO2014/171028 A1 | 10/2014 |

OTHER PUBLICATIONS

Notice of Refusal as received in the corresponding Patent Application No. 2018-514641 dated Jan. 28, 2021 w/English Translation.
Office Action as received in the corresponding JP patent application 2018-514641 dated May 25, 2021, English Translation Only, 6 pages.

\* cited by examiner

FLUORINATED COPOLYMER COMPOSITION, METHOD FOR ITS PRODUCTION, AND MOLDED PRODUCT

This application is a continuation of PCT Application No. PCT/JP2017/016436, filed on Apr. 25, 2017, which is based upon and claims the benefit of priority from Japanese Patent Application No. 2016-91886 filed on Apr. 28, 2016 and Japanese Patent Application No. 2016-172023 filed on Sept. 2, 2016. The contents of those applications are incorporated herein by reference in their entireties.

TECHNICAL FIELD

The present invention relates to a fluorinated copolymer composition, a method for its production, a molded product, an injection molded product, a prepreg and a fiber-reinforced molded product.

BACKGROUND ART

Engineering plastics such as a polyether ether ketone, a polyether sulfone, a polyether ketone ketone, etc. are excellent in heat resistance, mechanical properties, etc. and thus are widely used in various fields as molding materials for sliding members, etc.

However, these engineering plastics have difficulties in impact resistance at ordinary temperature or low temperature, and their improvement is desired.

For example, in Patent Document 1, it is proposed to melt-blend a fluororesin and polyether ketone ketone in a specific ratio for the purpose of improving the toughness at room temperature, the heat distortion temperature and/or the permeability.

PRIOR ART DOCUMENT

Patent Document

Patent Document 1: JP-A-H11-158340

DISCLOSURE OF INVENTION

Technical Problem

The present inventors have conducted extensive studies on the physical properties of a composition of an engineering plastic and a fluororesin, for the purpose of improving the impact resistance while maintaining excellent heat resistance and mechanical properties of the engineering plastic, and have found that the affinity between an engineering plastic and a fluororesin is not necessarily sufficient, whereby in the obtainable composition, the excellent physical properties of the engineering plastic and the fluororesin will not sufficiently be expressed, respectively, and thus it is not possible to obtain the expected effect of improving the mechanical properties. Further, there has been a problem also in its moldability such that when the obtainable composition is subjected to melt-molding such as extrusion molding, elimination of the resin will partially take place, whereby the surface of the molded product tends to be roughened and to be poor in surface smoothness. Further, it has been found that when the composition is injection-molded, there are cases where a defect due to defective molding will result such that surface roughness or delamination is observed in the injection molded product.

The present invention has been made in view of the above circumstances, and it is an object of the present invention to provide a fluorinated copolymer composition excellent in impact resistance and moldability without impairing excellent heat resistance and mechanical properties inherent to a thermoplastic heat-resistant resin such as an engineering plastic, and a method for its production.

Further, it is another object of the present invention to provide a molded product obtainable by molding a molding material comprising the fluorinated copolymer composition, and an injection molded product obtained by injection molding.

Further, it is another object of the present invention to provide a prepreg which is excellent in moldability and which is capable of producing a fiber-reinforced molded product having impact resistance, and to provide a fiber-reinforced molded product having impact resistance.

Solution to Problem

The present invention has the following constructions.

[1] A fluorinated copolymer composition comprising the following thermoplastic resin A and the following fluorinated elastomer B, wherein the fluorinated elastomer B is dispersed in the thermoplastic resin A, the number average particle diameter of the fluorinated elastomer B is from 1 to 300 μm, and the volume ratio of the thermoplastic resin A to the fluorinated elastomer B is from 97:3 to 55:45, and having a flexural modulus of from 1,000 to 3,700 MPa, (Thermoplastic Resin A)

at least one type of melt-moldable thermoplastic heat-resistant resin selected from the group consisting of a polyarylate, a polyether sulfone, a polyaryl sulfone, an aromatic polyamide, an aromatic polyether amide, an aromatic polyether imide, a polyphenylene sulfide, a polyaryl ether ketone, a polyamideimide and a liquid crystal polyester, (Fluorinated Elastomer B)

at least one type of fluorinated elastic copolymer comprising units based on at least one type of monomer selected from the group consisting of tetrafluoroethylene, hexafluoropropylene, vinylidene fluoride and chlorotrifluoroethylene.

[2] The fluorinated copolymer composition according to [1], wherein the fluorinated elastomer B is at least one type of fluorinated elastic copolymer selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a perfluoro(alkyl vinyl ether), and the perfluoro(alkyl vinyl ether) is a compound represented by the following formula (I), $$CF_2=CF(OR^F) \qquad (I)$$

wherein $R^F$ is a $C_{1-8}$ linear or branched perfluoroalkyl group.

[3] The fluorinated copolymer composition according to [1] or [2], wherein the thermoplastic resin A is at least one type of thermoplastic heat resistant resin selected from the group consisting of a polyaryl ether ketone, a polyether sulfone, an aromatic polyether amide and a polyaryl sulfone.

[4] The fluorinated copolymer composition according to any one of [1] to [3], wherein said polyaryl ether ketone is at least one member selected from the group consisting of a polyether ketone, a polyether ether ketone and a polyether ketone ketone.

[5] A molded product obtained by molding a molding material comprising the fluorinated copolymer composition as defined in any one of [1] to [4].

[6] A film composed of the molded product as defined in [5].

[7] The film according to [6], which has a surface roughness (Ra) of less than 4.0.

[8] A method for producing a film, comprising melt extrusion at a die temperature of from 350 to 420° C. to produce the film as defined in [6] or [7].

[9] An injection molded product obtained by injection molding a molding material comprising the fluorinated copolymer composition as defined in any one of [1] to [4].

[10] The molded product according to [5], which is used as a sliding member.

[11] The injection molded product according to [9], which is used as a sliding member.

[12] The molded product according to [5], which is a sealing member, a gear, an actuator, a piston, a bearing, a housing, an aircraft interior material, a fuel tube or a bushing.

[13] The injection molded product according to [9], which is a sealing member, a gear, an actuator, a piston, a bearing, a housing, an aircraft interior material, a fuel tube or a bushing.

[14] A method for producing a fluorinated copolymer composition, comprising melt-kneading the following thermoplastic resin A and the following fluorinated elastomer B in a volume ratio of from 97:3 to 55:45, wherein the melt-kneading is conducted, substantially in the absence of a crosslinking agent and crosslinking aid, so that the fluorinated elastomer B become particles having a number average particle diameter of from 1 to 300 μm, which are dispersed in the thermoplastic resin A, (Thermoplastic Resin A)

at least one type of melt-moldable thermoplastic heat resistant resin selected from the group consisting of a polyarylate, a polyether sulfone, a polyaryl sulfone, an aromatic polyamide, an aromatic polyether amide, a polyphenylene sulfide, a polyaryl ether ketone, a polyamideimide and a liquid crystal polyester, (Fluorinated Elastomer B)

at least one type of fluorinated copolymer comprising units based on at least one type of monomer selected from the group consisting of tetrafluoroethylene, hexafluoropropylene, vinylidene fluoride and chlorotrifluoroethylene.

[15] The method for producing a fluorinated copolymer composition according to [14], wherein the fluorinated elastomer B is at least one type of fluorinated copolymer selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a perfluoro(alkyl vinyl ether).

[16] The method for producing a fluorinated copolymer composition according to [14] or [15], wherein the thermoplastic resin A is at least one type of thermoplastic heat resistant resin selected from the group consisting of a polyaryl ether ketone, a polyether sulfone, an aromatic polyether amide and a polyaryl sulfone.

[17] The method for producing a fluorinated copolymer composition according to any one of [14] to [16], wherein said polyaryl ether ketone is at least one member selected from the group consisting of a polyether ketone, a polyether ether ketone and a polyether ketone ketone.

[18] The method for producing a fluorinated copolymer composition according to any one of [14] to [17], wherein the melt-kneading is conducted under conditions of a kneading temperature of from 220 to 480° C., an extrusion shear rate of from 3 to 2,500 $s^{-1}$ and a residence time in the extruder of from 10 to 290 seconds.

[19] A prepreg comprising the fluorinated copolymer composition as defined in any one of [1] to [4] and reinforcing fibers.

[20] A fiber-reinforced molded product using the prepreg as defined in [19].

Advantageous Effects Of Invention

The fluorinated copolymer composition of the present invention is excellent in impact resistance and moldability without impairing excellent heat resistance and mechanical properties inherent to a thermoplastic heat resistant resin.

The molded product and injection molded product of the present invention are excellent in heat resistance, mechanical properties and impact resistance and have a less defect due to molding failure.

According to the method for producing a fluorinated copolymer composition of the present invention, it is possible to produce a fluorinated copolymer composition excellent in impact resistance and moldability without impairing excellent heat resistance and mechanical properties inherent to a thermoplastic heat resistant resin.

The prepreg of the present invention contains a fluorinated copolymer composition of the present invention and thus is excellent in moldability and can be a raw material for a fiber-reinforced molded product having impact resistance.

The fiber-reinforced molded product of the present invention is formed by using the prepreg of the present invention containing the fluorinated copolymer composition of the present invention and thus is excellent in impact resistance.

DESCRIPTION OF EMBODIMENTS

The following definitions of terms apply throughout the specification including claims.

The term "units based on a monomer" means units derived from the monomer, which are formed by polymerization of the monomer. Units based on a monomer may be units formed directly by the polymerization reaction of the monomer, or may be units having a part of the units converted to another structure by treating the polymer.

[Fluorinated Copolymer Composition]

The fluorinated copolymer composition of the present invention comprises the thermoplastic resin A and the fluorinated elastomer B.

The volume ratio (A:B) of the thermoplastic resin A to the fluorinated elastomer B contained in the fluorinated copolymer composition of the present invention is from 97:3 to 55:45. Said volume ratio (A:B) is preferably from 95:5 to 57:43, more preferably from 95:5 to 60:40, further preferably from 93:7 to 60:40, particularly preferably form 90:10 to 65:35.

When the thermoplastic resin A is contained in the above range in the fluorinated copolymer composition, excellent heat resistance and mechanical properties will be obtained, and when the fluorinated elastomer B is contained in the above range, excellent flexibility and impact resistance will be obtained.

The volume ratio (A:B) is obtained by the following procedure.

Each mass w (g) of the thermoplastic resin A and the fluorinated elastomer B to be melt kneaded (to be introduced into a kneader) at the time of producing the fluorinated copolymer composition of the present invention is divided by each specific gravity d (g/cm$^3$) to obtain each volume (cm$^3$), and from the respective volumes (cm$^3$) of the thermoplastic resin A and the fluorinated elastomer B, the above volume ratio (A:B) is calculated.

The specific gravity is a value at 23° C. Each specific gravity of the thermoplastic resin A and the fluorinated elastomer B can be measured by an in-water displacement (suspension) method.

The total of the volumes of the thermoplastic resin A and the fluorinated elastomer B in the fluorinated copolymer composition of the present invention is preferably at least 50%, more preferably from 60 to 99%, further preferably from 70 to 97%, of the volume of the fluorinated copolymer composition.

When the proportion is at least the above lower limit value, excellent mechanical properties such as flexibility and mechanical strength, and excellent flexibility and impact resistance, which the composition of the thermoplastic resin A and the fluorinated elastomer B shows, can be developed. When the proportion is at most the above upper limit value, it becomes possible to impart new properties to the composition, while showing excellent heat resistance and mechanical properties, and excellent flexibility and impact resistance, which the composition of the thermoplastic resin A and the fluorinated elastomer B shows.

Further, in the fluorinated copolymer composition of the present invention, the fluorinated elastomer B is dispersed in the thermoplastic resin A, and the number average particle diameter thereof is from 1 to 300 μm, preferably from 5 to 200 μm, more preferably from 10 to 150 μm.

When the number average particle diameter is at least the above lower limit value, while securing the flexibility of the fluorinated elastomer B in the fluorinated copolymer composition, it is possible to improve the impact resistance of the fluorinated copolymer composition. When the number average particle diameter is at most the above upper limit value, the fluorinated elastomer B can be uniformly dispersed in the thermoplastic resin A, and the molded product will be excellent in mechanical properties.

Further, since the number average particle diameter is from 1 to 300 μm, it is not necessary to shear the fluorinated elastomer B more than necessary in the melt kneading step as described later, and while maintaining the molecular structure of the fluorinated elastomer B, it can be dispersed in the thermoplastic resin A. Thus, by dispersing in the thermoplastic resin A while securing the flexibility of the fluorinated elastomer B, it is possible to impart impact resistance which was insufficient only with the thermoplastic resin A, to the fluorinated copolymer composition, and thus to improve the impact resistance of the fluorinated copolymer composition.

For the number average particle diameter of the fluorinated elastomer B, the maximum diameters of 100 particles randomly selected, were measured by SEM observation, and their average value was taken as the number-average particle diameter.

The flexural modulus of the fluorinated copolymer composition is from 1,000 to 3,700 MPa, preferably from 1,300 to 3,500 MPa, more preferably from 1,500 to 3,400 MPa, further preferably from 1,700 to 3,300 MPa.

The upper limit value of the flexural modulus being 3,700 MPa means that the fluorinated elastomer B in the fluorinated copolymer composition is not cross-linked or substantially not cross-linked.

When the flexural modulus is at least the above lower limit value, it is possible to improve impact resistance, while maintaining the chemical, thermal and mechanical properties of the thermoplastic resin. When the flexural modulus is at most the above upper limit value, the fluorinated copolymer composition will have excellent flexibility, and the impact resistance will be improved.

The flexural modulus of the fluorinated copolymer composition was measured in accordance with ASTM D790.

(Thermoplastic Resin A)

The thermoplastic resin A is at least one type of melt-moldable thermoplastic heat resistant resin selected from the following group A. Group A: a polyarylate, a polyether sulfone, a polyaryl sulfone, an aromatic polyamide, an aromatic polyether amide, an aromatic polyether imide, a polyphenylene sulfide, a polyaryl ether ketone, a polyamideimide and a liquid crystal polyester.

As the thermoplastic resin A, one type, or two or more types may be used, but it is preferred to use one type.

The thermoplastic resin A is, in view of mechanical strength and heat resistance, preferably at least one type of thermoplastic heat resistant resin selected from the group consisting of a polyaryl ether ketone, a polyether sulfone (PES), an aromatic polyether amide and a polyaryl sulfone. As the polyaryl ether ketone, a polyether ketone (PEK), a polyether ether ketone (PEEK), or a polyether ketone ketone (PEKK) is preferred. PEEK or PES is more preferred.

The melting point of the thermoplastic resin A is preferably from 200 to 430° C., more preferably from 250 to 400° C., further preferably from 280 to 380° C.

When the melting point is at least the above lower limit value, it is possible to maintain excellent heat resistance shown by the composition of the thermoplastic resin A and the fluorinated elastomer B. When the melting point is at most the above upper limit value, it is possible to suppress deterioration of the physical properties due to thermal decomposition of the fluorinated elastomer B at the time of melt kneading, and it is possible to maintain the characteristics of the fluorinated elastomer such as the flexibility, impact resistance, chemical resistance, etc.

The melt flow rate (MFR) of the thermoplastic resin A is preferably from 0.1 to 300 g/10 min, more preferably from 1 to 100 g/10 min, further preferably from 3 to 70 g/10 min.

When the melt flow rate (MFR) is at least the above lower limit value, a melt-moldable composition having no roughening in appearance is obtainable. When the melt flow rate (MFR) is at most the above upper limit value, dispersibility in the composition of the thermoplastic resin A and the fluorinated elastomer B will be good, and as a result, the mechanical properties, heat resistance, flexibility and impact resistance will be excellent.

For MFR, in accordance with ASTM D3307, the mass (g) of the resin flowing out in 10 minutes from a nozzle of a diameter of 2 mm and a length of 8 mm under a load of 49N (5 kg) at 372° C. is measured, and the obtained value is adopted as MFR (g/10 minutes).

As the thermoplastic resin A, a commercially available thermoplastic heat resistant resin may be used, or it may be produced from various raw materials by using known methods.

(Fluorinated Elastomer B)

The fluorinated elastomer B is a fluorinated elastic copolymer comprising units based on at least one type of monomer (hereinafter referred to also as "the monomer (MB1)") selected from the group consisting of tetrafluoroethylene (TFE), hexafluoropropylene (HFP), vinylidene fluoride (VdF) and chlorotrifluoroethylene (CTFE).

As the fluorinated elastomer B, one type may be used, or two or more types may be used, but it is preferred to use one type.

The fluorinated elastomer B may be a fluorinated elastic copolymer composed solely of two or three types of units selected from the group consisting of units based on TFE (hereinafter referred to also as "TFE units"; the same applies to the other units), HFP units, VdF units and CTFE units, or it may be a fluorinated elastic copolymer composed of at least one type of units based on the monomer (MB1) and the following monomer (MB2) copolymerizable with the monomer (MB1).

The monomer (MB2) is at least one type of monomer selected from the group consisting of ethylene (E), propylene (P), a perfluoro(alkyl vinyl ether) (PAVE), vinyl fluoride (VF), 1,2-difluoroethylene (DiFE), 1,1,2-trifluoroethylene (TrFE), 3,3,3-trifluoro-1-propylene (TFP), 1,3,3,3-tetrafluoropropylene and 2,3,3,3-tetrafluoropropylene.

Here, PAVE is a compound represented by the following formula (I), and specifically, perfluoro(methyl vinyl ether) (PMVE), perfluoro(ethyl vinyl ether) (PEVE), perfluoro(propyl vinyl ether) (PPVE) or perfluoro(butyl vinyl ether) (PBVE) may be mentioned.

$$CF_2=CF(OR^F) \qquad (I)$$

wherein $R^F$ is a $C_1$-8 linear or branched perfluoroalkyl group.

The fluorinated elastomer B may have at least one type of units based on another monomer (hereinafter referred to also as "the monomer (MB3)") other than the monomer (MB1) and the monomer (MB2), which is copolymerizable with the monomer (MB1), whereby the copolymer becomes to be an elastic copolymer.

In all units constituting the fluorinated elastomer B, the units based on the monomer (MB3) are preferably at most 20 mol %, more preferably at most 5 mol %, and further preferably, the fluorinated elastomer B has no units based on the monomer (MB3).

The fluorinated elastomer B is preferably such that 100 mol % of all units constituting the fluorinated elastomer B is either composed of two or three types of units based on the monomer (MB1), or composed of at least one type of units based on the monomer (MB1) and at least one type of units based on the monomer (MB2). However, it is allowable to contain units other than these as impurities, etc.

The fluorinated elastic copolymer composed of two or three types of units based on the monomer (MB1), and the fluorinated elastic copolymer composed of at least one type of units based on the monomer (MB1) and at least one type of units based on the monomer (MB2), contribute to the flexibility of the fluorinated copolymer composition.

The fluorinated elastomer B may be a TFE/P-containing copolymer (meaning a copolymer comprising TFE units and P units; here, the proportion of the total of the respective units connected by "/", i.e. in the case of a TFE/P-containing copolymer, the total of TFE units and P units, occupying in the total of all units, is preferably at least 50 mol %; the same applies to other "containing copolymers"), a HFP/VdF-containing copolymer, or a TFE/PAVE-containing copolymer.

Here, the TFE/PAVE copolymer does not include a copolymer which, even if it has TFE units and PAVE units, further contains P units or VdF units. Further, the HFP/VdF-containing copolymer does not include a copolymer which, even if it has HFP units and VdF units, further contains P units.

The TFE/P copolymer may be TFE/P (meaning a copolymer comprising TFE units and P units; the same applies to other), TFE/P/VF, TFE/P/VdF, TFE/P/E, TFE/P/TFP, TFE/P/PAVE, TFE/P/1,3,3,3-tetrafluoropropene, TFE/P/2,3,3,3-tetrafluoropropene, TFE/P/TrFE, TFE/P/DiFE, TFE/P/VdF/TFP or TFE/P/VdF/PAVE, and among them, TFE/P is preferred.

The HFP/VdF-containing copolymer may be HFP/VdF, TFE/VdF/HFP, TFE/VdF/HFP/TFP, TFE/VdF/HFP/PAVE, VdF/HFP/TFP or VdF/HFP/PAVE, and among them, HFP/VdF is preferred.

The TFE/PAVE-containing copolymer may be TFE/PAVE, TFE/PMVE or TFE/PMVE/PPVE, and among them, TFE/PMVE is preferred.

As the fluorinated elastomer B, in addition to the above-mentioned TFE/P-containing copolymer, HFP/VdF-containing copolymer, and TFE/PAVE-containing copolymer, TFE/VdF/2,3,3,3-tetrafluoropropene, VdF/PAVE, VdF/2,3,3,3-tetrafluoropropene, or E/HFP may be mentioned.

Among the above-mentioned fluorinated elastomers B, the TFE/P-containing copolymer, the HFP/VdF-containing copolymer or the TFE/PAVE-containing copolymer is preferred; the TFE/P-containing copolymer is more preferred; and TFE/P is further preferred. TFE/P is particularly excellent in thermal stability during melt-kneading, and the transporting properties are stabilized at the time of melt kneading. Also, it is preferred since coloration or foaming of the molded product of the present invention will be reduced.

The compositions of these elastomers are preferably within the following ranges, from the viewpoint of easily contributing to the flexibility of the fluorinated copolymer composition of the present invention.

TFE/P (meaning the molar ratio of TFE units to P units; the following ratios are likewise molar ratios) is preferably 30-80:70-20, more preferably 40-70:60-30, further preferably 60-50:40-50. In TFE/P/VF, TFE:P:VF=preferably 30-60:60-20:0.05-40. In TFE/P/VdF, TFE:P:VdF=preferably 30-60:60-20:0.05-40. In TFE/P/E, TFE:P:E=preferably 20-60:70-30:0.05-40. In TFE/P/TFP, TFE:P:TFP=preferably 30-60:60-30:0.05-20. In TFE/P/PAVE, TFE:P:PAVE=preferably 40-70:60-29.95:0.05-20. In TFE/P/1,3,3,3-tetrafluoropropene, TFE:P:1,3,3,3-tetrafluoropropene=preferably 30-60:60-20:0.05-40. In TFE/P/2,3,3,3-tetrafluoropropene, TFE:P:2,3,3,3-tetrafluoropropene=preferably 30-60:60-20:0.05-40. In TFE/P/TrFE, TFE:P:TrFE=preferably 30-60:60-20:0.05-40. In TFE/P/DiFE, TFE:P:DiFE=preferably 30-60:60-20:0.05-40. In TFE/P/VdF/TFP, TFE:P:VdF:TFP=preferably 30-60:60-20:0.05-40:0.05-20. In TFE/P/VdF/PAVE, TFE:P:VdF:PAVE=preferably 30-70:60-20:0.05-40:0.05-20. In HFP/VdF, HFP:VdF=preferably 99-5:1-95. In TFE/VdF/HFP, TFE:VdF:HFP=preferably 20-40:1-40:20-40. In TFE/VdF/HFP/TFP, TFE:VdF:HFP:T FP=preferably 30-60:0.05-40:60-20:0.05-20. In TFE/VdF/HFP/PAVE, TFE:VdF:HFP:PAVE=preferably 30-70:60-20:0.05-40:0.05-20. In VdF/HFP/TFP, VdF:HFP:TFP=preferably 1-90:95-5:0.05-20. In VdF/HFP/PAVE, VdF:HFP:PAVE=preferably 20-90:9.95-70:0.05-20. In TFE/PAVE, TFE: PAVE=preferably 40-70:60-30. In TFE/PMVE, TFE:PMVE=preferably 40-70:60-30. In TFE/PMVE/PPVE, TFE:PMVE:PPVE=preferably 40-70:3-57:3-57. In TFE/VdF/2,3,3,3-tetrafluoropropene, TFE:VdF:2,3,3,3-tetrafluoropropene=preferably 1-30:30-90:5-60. In VdF/PAVE, VdF:PAVE=preferably 3-95:97-5. In VdF/2,3,3,3-tetrafluoropropene, VdF:2,3,3,3- tetrafluoropropene=preferably 30-95:70-5. In E/HFP, E:HFP=preferably 40-60:60-40.

The fluorine content in the fluorinated elastomer B is preferably from 50 to 74 mass %, more preferably from 55 to 70 mass %. The content is specifically preferably from 57 to 60 mass % in a TFE/P copolymer, preferably from 66 to 71 mass % in a HFP/VdF copolymer, and preferably from 66 to 70 mass % in a TFE/PMVE copolymer.

When the content is at least the above lower limit value, excellent heat resistance and chemical resistance will be obtained. When the content is at most the above upper limit value, the flexibility of the fluorinated copolymer composition will be increased.

The content is obtainable by an analysis of the fluorine content and represents the proportion of the mass of fluorine atoms to the total mass of all atoms constituting the fluorinated elastomer B.

The analysis of the fluorine content is carried out by obtaining the molar ratios of the respective units in the fluorinated copolymer, from the melt NMR measurements and total fluorine content measurement.

The number average molecular weight of the fluorinated elastomer B is preferably from 10,000 to 1,500,000, more preferably from 20,000 to 1,000,000, further preferably from 20,000 to 800,000, particularly preferably from 50,000 to 600,000. When the number average molecular weight is at least the above lower limit value, the mechanical strength of the molded body will be good. When the number average molecular weight is at most the above upper limit value, the fluorinated elastomer B will have a high fluidity so that its dispersion in the thermoplastic resin A will be good, and the flexibility of the fluorinated copolymer composition will be increased.

The Mooney viscosity ($ML_{1+10}$, 121° C.) of the fluorinated elastomer B is preferably from 20 to 200, more preferably from 30 to 150, further preferably from 40 to 120.

The Mooney viscosity is an index for the molecular weight and may be measured in accordance with JIS K6300-1: 2000. The larger this value, the larger the molecular weight, and the smaller this value, the smaller the molecular weight. When the Mooney viscosity is within the above range, the fluorinated copolymer composition will be excellent in mechanical properties and moldability.

The number average particle diameter of the fluorinated elastomer B before melt-kneading is preferably at most 10 mm, more preferably at most 8 mm, further preferably at most 6 mm. When it is within the above range, such is preferred since transportability by screws during the melt-kneading will be good. The number average particle diameter of the fluorinated elastomer (B) before melt-kneading is one obtained by randomly selecting 100 particles by an optical microscope, measuring their particle sizes and obtaining an average value.

(Preparation of Fluorinated Elastomer B)

The fluorinated elastomer B can be produced by copolymerizing at least one type of the monomer (MB1) and, as the case requires, one or both of the monomer (MB2) and the monomer (MB3).

The polymerization method may be an emulsion polymerization method, a solution polymerization method, a suspension polymerization method, a bulk polymerization method, etc. An emulsion polymerization method of polymerizing monomers in the presence of an aqueous medium and an emulsifier, is preferred, since it is thereby easy to adjust the number-average molecular weight of the fluorinated copolymer or the copolymer composition, and the productivity will be excellent.

In the emulsion polymerization method, an latex of an elastomer is obtainable via a step (emulsion polymerization step) of polymerizing (emulsion polymerizing) a monomer component comprising the above-mentioned monomers in the presence of an aqueous medium, an emulsifier and a radical polymerization initiator. In the emulsion polymerization step, a pH adjusting agent may be added.

(Other Components)

The fluorinated copolymer composition of the present invention may contain, in addition to the thermoplastic resin A and the fluorinated elastomer B, other components as optional components.

Other components may be additives such as a filler, a plasticizer, a flame retardant, etc.

One of these additives may be used alone, or two or more of them may be used in combination.

In a case where other components as optional components are to be incorporated in the fluorinated copolymer composition, the total of the volumes of such other components is preferably at most 50% of the volume of the fluorinated copolymer composition, more preferably from 1 to 40 vol %, further preferably from 3 to 30 vol %.

Fillers as other components may be inorganic fillers, etc.

The inorganic fillers may be $CaCO_3$, $SiO_2$, $TiO_2$, $BaSO_4$, ZnO, $Al(OH)_3$, $Mg(OH)_2$, talc, mica, carbon black, white carbon, clay, carbon nanotubes, glass fibers, carbon fibers, etc.

Carbon black may be used without limitation so long as it is one to be used as a filler for a fluorocarbon rubber. Specific examples thereof include furnace black, acetylene black, thermal black, channel black, graphite, etc., and furnace black is preferred. The furnace black includes HAF-LS carbon, HAF carbon, HAF-HS carbon, FEF carbon, GPF carbon, APF carbon, SRF-LM carbon, SRF-HM carbon, MT carbon, etc., and among them, MT carbon is more preferred.

In a case where the fluorinated copolymer composition contains carbon black, the content of carbon black is preferably from 1 to 50 parts by mass, more preferably from 3 to 20 parts by mass, to 100 parts by mass of the fluorinated elastomer A. When the content is at least the above lower limit value, a crosslinked product obtained by crosslinking of the fluorinated copolymer composition will be excellent in strength, and the reinforcing effect by incorporation of carbon black will be sufficiently obtained. Further, when the content is at most the above upper limit value, elongation of the cross-linked product will also be excellent. Thus, when the content is within the above range, the balance between the strength and the elongation of the crosslinked product will be good.

In a case where the fluorinated copolymer composition contains a filler other than carbon black, the content thereof is preferably from 5 to 200 parts by mass, more preferably from 10 to 100 parts by mass, to 100 parts by mass of the fluorinated elastomer A.

Here, as the filler, at least one type may be used singly, and carbon black and another filler may be used in combination. In a case where the molded product contains carbon black and another filler, the content thereof is preferably from 1 to 100 parts by mass, more preferably from 3 to 50 parts by mass, to 100 parts by mass of the fluorinated elastomer A.

Plasticizers and flame retardants as other components are not particularly limited, and known plasticizers and flame retardants may be employed. As the plasticizers, phthalic acid esters, adipic acid esters, etc. may be mentioned. As the flame retardants, aluminum hydroxide, magnesium hydroxide, magnesium carbonate, antimony trioxide, sodium antimonate, antimony pentoxide, phosphazene compounds, phosphoric acid esters, ammonium polyphosphate, melamine polyphosphate, melam melem, red phosphorus, molybdenum compounds, borate compounds, PTFE, etc. may be mentioned, and antimony trioxide; phosphoric acid esters such as triphenyl phosphate, tricresyl phosphate, trixylenyl phosphate, cresyl phenyl phosphate, 2-ethylhexyl diphenyl phosphate and other aromatic phosphoric acid esters; and PTFE being an anti-dripping agent which forms a fibril structure in the resin; are preferred.

[Method for Producing Fluorinated Copolymer Composition]

The method for producing a fluorinated copolymer composition of the present invention, comprises a step (hereinafter referred to also as a "melt-kneading step") of melt-kneading the thermoplastic resin A and the fluorinated elastomer B, and, as the case requires, other components as optional components.

In the case of incorporating other components as optional components in the fluorinated copolymer composition, such other components may be added in the step of melt-kneading the thermoplastic resin A and the fluorinated elastomer B, or may be added after melt-kneading the thermoplastic resin A and the fluorinated elastomer B.

In the melt-kneading step, melt-kneading is conducted by adjusting the volume ratio (A:B) of the thermoplastic resin A to the fluorinated elastomer B to be from 97:3 to 55:45. Said volume ratio (A:B) is preferably from 95:5 to 57:43, more preferably from 95:5 to 60:40, further preferably from 93:7 to 60:40, particularly preferably from 90:10 to 65:35.

When said volume ratio (A:B) is within the above range, there will be no roughness on appearance of the strand obtainable at the time of melt kneading, and as a result, the obtainable pellets will be excellent in melt moldability.

Further, when the thermoplastic resin A is contained within the above range, excellent heat resistance, mechanical properties and impact resistance will be obtained. When the fluorinated elastomer B is contained within the above range, excellent flexibility will be obtained, and it is also possible to prevent roughness on the surface of the molded product.

As the apparatus to be used in the melt-kneading step, it is possible to use a known apparatus having a melt-kneading function; a single screw extruder or twin-screw extruder which may be provided with a screw with a high kneading effect, is preferred; a twin-screw extruder is more preferred; a twin-screw extruder provided with screws with a high kneading effect is further preferred. As the screw with a high kneading effect, it is possible to select one which has a sufficient kneading effect to the object to be melt-kneaded and which does not give an excessive shearing force.

As an apparatus having such a melt kneading function, Laboplastmill mixer (manufactured by Toyo Seiki Seisakusho, Ltd.) may be mentioned.

As for the method of supplying the thermoplastic resin A and the fluorinated elastomer B to the apparatus having a melt-kneading function, the thermoplastic resin A and the fluorinated elastomer B may be premixed, and the obtained mixture may be supplied to the apparatus having a melt kneading function, or the thermoplastic resin A and the fluorinated elastomer B may be separately supplied to the apparatus having a melt kneading function.

Further, in the case of incorporating other components as optional components in the fluorinated copolymer composition, such other components may be premixed with one of the thermoplastic resin A and the fluorinated elastomer B, and the mixture may be supplied to the apparatus having a melt kneading function, or separately from the thermoplastic resin A and the fluorinated elastomer B, such other components may be supplied to the apparatus having a melt kneading function. Further, as mentioned above, such other components may be added after the thermoplastic resin A and the fluorinated elastomer B are melt-kneaded.

The kneading temperature in the melt-kneading step may depend on the thermoplastic resin A and the fluorinated elastomer B to be used, but is preferably from 220 to 480° C., more preferably from 280 to 450° C., further preferably from 290 to 420° C., particularly preferably from 300 to 400° C.

The extrusion shear rate in the melt-kneading step is preferably set depending on the melt viscosity of the object to be melt-kneaded at the kneading temperature in the above melt-kneading step.

The extrusion shear rate in the melt-kneading step is preferably from 3 to 2,500 s$^{-1}$, more preferably from 10 to 2,000 s$^{-1}$, further preferably form 15 to 1,500 s$^{-1}$.

In the melt kneading step, the residence time in the apparatus having a melt kneading function of the object to be melt-kneaded, is preferably from 10 to 290 seconds, more preferably from 20 to 240 seconds, further preferably from 30 to 210 seconds.

In the method for producing a fluorinated copolymer composition of the present invention, the melt-kneading step is conducted so that the fluorinated elastomer B becomes to be particles with a number average particle diameter of from 1 to 300 μm, which are dispersed in the thermoplastic resin A.

By suitably adjusting the kneading temperature, the extrusion shear rate and the residence time in the apparatus having a melt kneading function of the object to be melt-kneaded, in the melt-kneading step, it is possible to carry out the melt kneading step so that the fluorinated elastomer B becomes to be particles with a number average particle diameter of from 1 to 300 μm, which are dispersed in the thermoplastic resin A.

When the kneading temperature is sufficiently high in the melt-kneading step, the fluorinated elastomer B will be easily dispersed in the thermoplastic resin A at the time of melt kneading, and coarse particles of the fluorinated elastomer B are unlikely to remain. When the kneading temperature is sufficiently low, thermal decomposition of the fluorinated elastomer B will be less likely to be promoted; heat resistance of the fluorinated copolymer composition will be excellent; and the fluorinated elastomer B is less likely to be small-sized too much.

When the extrusion shear rate in the melt-kneading step is sufficiently large, the fluorinated elastomer B will be easily dispersed in the thermoplastic resin A at the time of melt kneading, and coarse particles of the fluorinated elastomer B are unlikely to remain. When the extrusion shear rate is sufficiently small, the fluorinated elastomer B is less likely to be small-sized too much.

When the residence time in the apparatus having a melt kneading function of the object to be melt-kneaded in the melting step is sufficiently long, the fluorinated elastomer B will be easily dispersed in the thermoplastic resin A at the time of melt kneading, and coarse particles of the fluorinated elastomer B are unlikely to remain.

When the residence time is sufficiently short, thermal decomposition of the fluorinated elastomer B will be less likely to be promoted.

Further, the melt-kneading step is conducted substantially in the absence of a crosslinking agent or crosslinking aid.

Here, "conducted substantially in the absence of a crosslinking agent or crosslinking aid", means that the melt-kneading is conducted without letting the fluorinated elastomer B in the fluorinated copolymer composition be substantially crosslinked. Whether or not the fluorinated elastomer B in the fluorinated copolymer composition is substantially crosslinked, can be confirmed by the value of the flexural modulus of the fluorinated copolymer composition. If the fluorinated elastomer B is substantially crosslinked, the flexibility of the fluorinated elastic copolymer is lost, whereby the flexural modulus of the fluorinated copolymer composition exceeds 3,700 MPa.

By conducting the melt-kneading step substantially in the absence of a crosslinking agent and crosslinking aid, it is possible to secure the flexibility of the fluorinated elastomer B in the fluorinated copolymer composition, and to improve the impact resistance of the fluorinated copolymer composition.

As described above, by melt-kneading the object to be melt-kneaded comprising thermoplastic resin A and the fluorinated elastomer B, a fluorinated copolymer composition comprising the thermoplastic resin A and the fluorinated elastomer B is obtainable, and the obtained fluorinated copolymer composition is melt-moldable and can be made into a molded product by melt molding.

The fluorinated copolymer composition of the present invention can be made into a powder form to be used as a coating material. Applications as coated articles may be those described in WO2015/182702.

The fluorinated copolymer composition of the present invention is also useful as an additive to a fiber-reinforced molded product of the present invention, or as a matrix resin of a prepreg of the present invention.

[Molded Product]

The molded product of the present invention is a molded product obtained by molding a molding material comprising the fluorinated copolymer composition of the present invention.

Polymer fillers may be mentioned as components to be contained in the molding material, other than the fluorinated copolymer composition of the present invention.

As such polymer fillers, polycarbonate, polyethylene terephthalate, polybutylene terephthalate, polyarylate, polycaprolactone, phenoxy resins, polysulfone, polyether sulfone, polyether ketone, polyether ether ketone, polyether imide, polyamide 6, polyamide 66, polyamide 11, polyamide 12, polyamide 610, polyphenylene oxide, polyphenylene sulfide, polytetrafluoroethylene, acrylonitrile/butadiene/styrene copolymer (ABS), polymethyl methacrylate (PMMA), polypropylene, polyethylene, polybutadiene, butadiene-styrene copolymer, ethylene-propylene-diene rubber (EPDM), styrene-butadiene block copolymer, butadiene-acrylonitrile copolymer, acrylic rubber, styrene-maleic anhydride copolymer, styrene-phenyl maleimide copolymer, etc. may be mentioned.

The method for molding the molding material comprising the fluorinated copolymer composition of the present invention is not particularly limited so long as it is a usual molding method, and it may, for example, be injection molding, extrusion molding, coextrusion molding, blow molding, compression molding, inflation molding, transfer molding, calendar molding, etc. The fluorinated copolymer composition of the present invention is excellent particularly in melt-moldability, and therefore, the molded product of the present invention is preferably an injection molded product formed by injection molding.

The melt molding apparatus to be used for melt molding of the fluorinated copolymer composition, may be one commonly used in melt molding, and, for example, hot pressing duplex "Model: SA-301" (melt heat press machine, manufactured by Tester Sangyo Co., Ltd.) may be mentioned.

The production of a molded product may be carried out continuously subsequent to the above-described production of the fluorinated copolymer composition.

The molded product of the present invention may be used in various applications. Specific examples may be, although not particularly limited, a sliding member, a sealing material, a gear, an actuator, a piston, a bearing, a housing, an aircraft interior material, a fuel tube, a bushing, a tube, a hose, a tank, a seal, a wire, a cable, a film, a sheet, a bottle, a fiber, etc.

As the tube, hose, tank, seal or wire, those described in WO2015/182702 may be mentioned. Further, the tube or hose may be a tube for drilling for energy resources such oil, natural gas, shale oil, etc. An electric wire covering material for wires, cables, etc. is preferably used as an insulating covering of an electric wire or rectangular copper wire for motor coils, particularly as an insulating covering of a rectangular conductor to be used in a drive motor for a hybrid vehicle (HEV) or an electric vehicle (EV), and in such a case, insulating covering is preferably made by a film. An application to a downhole cable for drilling for energy resources such as oil, natural gas, shale oil, etc. may also be mentioned. Further, applications to a speaker vibration plate, a plate for traumatic injury or bone fracture, an insulating paper in various electrical insulating adhesive tapes, such as an insulating paper in a motor, a sealing tape to be used in oil and natural gas pipes, etc., may also be mentioned.

The shape of the molded product of the present invention is not particularly limited, and the molded product may be used in shapes, for applications and as riser pipes, as described in WO2015/182702.

The molded product of the present invention is made of a fluorinated copolymer composition having impact resistance improved and being excellent in moldability without impairing excellent heat resistance and mechanical properties inherent to a thermoplastic heat resistant resin such as an engineering plastic, and therefore, is preferably used for applications where these properties are required, and it is more preferably used as a housing or an aircraft interior material.

The melt extrusion molding method for a film is not particularly limited, but a flat-die method or an inflation method is preferred. In a flat die method, the flow rate of the molten resin and the thickness of the product can be precisely controlled by adjusting the choke bar or the lip in the die. Further, in an inflation method, by introducing air from a circular die into an extruded product for inflation to obtain a film, it is possible to control the film thickness to be uniform.

The cylinder temperature at the time of the above molding is preferably from 300 to 420° C., more preferably from 330 to 370° C. Further, the die temperature is preferably from 350 to 420° C., more preferably from 350 to 380° C. Within the above range, the obtainable film will be excellent in surface smoothness since the friction stress with the die is reduced, and at the same time, decomposition of the resin due to the thermal history during molding will be suppressed, whereby the surface smoothness of the film will be excellent.

The extrusion shear rate during film molding is preferably from 3 to 2,500 $\sec^{-1}$, more preferably from 10 to 1,000 sec$^{-1}$, further preferably from 10 to 100 sec$^{-1}$. The residence time in the apparatus is preferably from 10 to 1,000 seconds, more preferably from 60 to 500 seconds.

[Prepreg]

The prepreg of the present invention comprises a matrix resin and reinforcing fibers. Specifically, it is a sheet-form material having a matrix resin impregnated to reinforcing fibers, and it may be said to be a sheet-form material having reinforcing fibers embedded in the matrix resin. The matrix resin is the above-described fluorinated copolymer composition of the present invention.

(Reinforcing Fibers)

As the reinforcing fibers, from the viewpoint of mechanical properties of the fiber-reinforced molded product, continuous long fibers with a length of at least 10 mm are preferred. The reinforcing fibers need not be continuous over the entire length in the longitudinal direction or the entire width direction in the width direction, of the reinforcing fiber sheet, and they may be divided in the middle.

As a processed form of the reinforcing fibers, from the viewpoint of mechanical properties of the fiber-reinforced molded product, one processed into a sheet-form (hereinafter referred to also as a "reinforcing fiber sheet") is preferred.

The reinforcing fiber sheet may be a reinforcing fiber bundle composed of a plurality of reinforcing fibers, a cloth made by weaving such reinforcing fiber bundles, a unidirectional reinforcing fiber bundle having a plurality of reinforcing fibers aligned in one direction, a unidirectional cloth composed of such unidirectional fiber bundles, a combination thereof, one having a plurality of reinforcing fiber bundles laminated, etc.

The reinforcing fibers may be inorganic fibers, metal fibers, organic fibers, etc.

The inorganic fibers may be carbon fibers, graphite fibers, glass fibers, silicon carbide fibers, silicon nitride fibers, alumina fibers, silicon carbide fibers, boron fibers, etc.

The metal fibers may be aluminum fibers, brass fibers, stainless steel fibers, etc.

The organic fibers may be aromatic polyamide fibers, polyaramide fibers, polyparaphenylene benzoxazole (PBO) fibers, polyphenylene sulfide fibers, polyester fibers, acrylic fibers, nylon fibers, polyethylene fibers, etc.

The reinforcing fibers may be ones having surface treatment applied.

As the reinforcing fibers, one type may be used alone, or two or more types may be used in combination.

As the reinforcing fibers, carbon fibers are preferred, since the specific gravity is small, and they have high strength and high modulus.

[Fiber-Reinforced Molded Product]

The fiber-reinforced molded product of the present invention is one using the prepreg of the present invention.

The fiber-reinforced molded product of the present invention may be one formed by using only the prepreg of the present invention; may be a laminate formed by using the prepreg of the present invention and another prepreg other than the prepreg of the present invention; or may be a laminate formed by using the prepreg of the present invention, and, as the case requires, another prepreg and a member other than prepregs.

Another prepreg may be a prepreg wherein the matrix resin comprises the thermoplastic resin A and does not contain the fluorinated elastomer B; or a prepreg wherein the matrix resin comprises the fluorinated elastomer B and does not contain the thermoplastic resin A.

The member other than prepregs may be a metal member; a resin film containing the thermoplastic resin A; a resin film containing the fluorinated elastomer B, etc.

The metal member may be a metal foil, various metal parts, etc. As the metal, iron, stainless steel, aluminum, copper, brass, nickel, zinc, etc. may be mentioned. The shape of the metal member is not particularly limited, and may suitably be selected according to the fiber-reinforced molded product to be obtained.

The fiber-reinforced molded product of the present invention may be formed by usual hot press molding treatment by using the prepreg of the present invention.

The fiber-reinforced molded product of the present invention may be used as one disclosed in WO2015/182702, a housing for a smart phone, a core material for a power line, a pressure container for storage of hydrogen or fuel oil such as gasoline, a repair or reinforcing sheet for a tunnel or road, etc. In particular, it is preferably used for an aircraft member, a blade for a windmill, an outer plate for an automobile, a housing for an electronic device, a tray or chassis, a sporting good (a frame of a tennis racket, a bat, a golf club shaft, a fishing rod, a bicycle frame, a rim, a wheel, a crank, etc.), etc.

Further, the molded product of the present invention may be used as laminated or composited partially with another material. As such another material, a metal (iron, copper, stainless steel, etc.), glass, plastic, rubber, etc. may be mentioned.

Specific examples of the plastic may be those described in WO2015/182702, a liquid crystal polymer, a polyaryl ketone, a polyether sulfone, a polyphenyl sulfone, a polyacetal, a polyurethane, etc. As the polyamide, polyamide 6, polyamide 66, polyamide 46, polyamide 11, polyamide 12, polyamide 610, polyamide 612, polyamide 6/66 copolymer, polyamide 6/66/610 copolymer, polyamide MXD6, polyamide 6T, polyamide 9T, and polyamide 6/6T copolymer, etc. may be mentioned.

EXAMPLES

Hereinafter, the present invention will be described in detail with reference to Examples, but the present invention is not limited to these Examples. Here, the respective measurement items were measured by the following methods.

(Measurement of MFR)

By using Melt Indexer manufactured by Techno Seven Co., Ltd. in accordance with ASTM D3307, the mass (g) of a resin flowing out in 10 minutes from a nozzle with a diameter of 2 mm and a length of 8 mm at 372° C. under a load of 49N (5 kg), was measured, and the obtained value was adopted as MFR (g/10 min).

(Measurement of Flexural Modulus)

Measured in accordance with ASTM D790 by using TENSILON (Model: UTM-5T) manufactured by TOYO BALDWIN Co.

(Measurement of Number Average Particle Diameter)

The maximum diameters of 100 particles randomly selected by the observation using Electronic Microscope (Model: S-4800) manufactured by Hitachi, Ltd. were measured, and their average value was adopted as the number average particle diameter.

The number average particle diameter of the fluorinated elastomer (B-1) or (B-2) before melt-kneading is one such that, using an optical microscope (manufactured by Maruto Instrument Co., Ltd., SCOPEMAN MS-802), 100 particles were randomly selected, and their particle diameters were measured, whereupon the average value was obtained.

(Evaluation of Surface State)

The surface was visually observed to confirm the presence or absence of delamination. A case where no delamination was observed at all on the surface, was identified by "A", and a case where delamination was slightly observed, or delamination was entirely observed, was identified by "B".

(Materials Used)

Thermoplastic resin (A-1): polyether ether ketone (melting point: 340° C., MFR: 17.3 g/10 min, manufactured by Victrex Japan Ltd., product name "VICTREX PEEK 150P")

Thermoplastic resin (A-2): polyphenyl sulfone (manufactured by BASF Corp., "Ultrason P3010")

Fluorinated elastomer (B-1): tetrafluoroethylene-propylene copolymer (manufactured by Asahi Glass Company, Limited, product name "AFLAS 150FC", number average particle diameter: 4.5 µm)

Fluorinated elastomer (B-2): hexafluoropropylene-vinylidene fluoride copolymer (manufactured by DuPont Co., grade name "Viton free flow SCPW", number average particle diameter: 0.8 µm)

Ex. 1

To the base end of the screw of a twin-screw extruder (KZW15TW-45HG1100, screw diameter: 15 mmφ, L/D: 45, manufactured by TECHNOVEL Corp.), the thermoplastic resin (A-1) and the fluorinated elastomer (B-1) were continuously charged so that the volume ratio would be 90:10 and the total charged amount would be 2.0 kg/hr, and by adjusting the screw rotation speed to be 200 rpm and the temperature to be 380° C., from the forward end side of the screw, the kneaded product was continuously discharged at 2.0 kg/hr, to obtain a kneaded product 1 being a fluorinated copolymer composition. Here, the set temperatures of cylinders, head and die were C1/C2/C3/C4/C5/C6/D/H=340/350/360/370/370/370/350/350° C.

Ex. 2

A kneaded product 2 being a fluorinated copolymer composition was obtained in the same manner as in Ex. 1, except that the thermoplastic heat-resistant resin (A-1) and the fluorinated elastomer (B-1) were continuously charged so that their volume ratio would be 80:20.

Ex. 3

A kneaded product 3 being a fluorinated copolymer composition was obtained in the same manner as in Ex. 1, except that the thermoplastic heat-resistant resin (A-1) and the fluorinated elastomer (B-1) were continuously charged so that their volume ratio would be 70:30.

Ex. 4

A kneaded product 4 being a fluorinated copolymer composition was obtained in the same manner as in Ex. 1, except that the thermoplastic heat-resistant resin (A-1) and the fluorinated elastomer (B-1) were continuously charged so that their volume ratio would be 50:50.

Ex. 5

A kneaded product 5 was obtained in the same manner as in Ex. 1, except that the fluorinated elastomer (B-1) was not used (i.e. the volume ratio of the thermoplastic heat-resistant resin (A-1) to the fluorinated elastomer (B-1) was 100:0).

Ex. 6

A kneaded product 6 was obtained in the same manner as Ex. 1, except that instead of the fluorinated elastomer (B-1), the thermoplastic heat-resistant resin (A-2) was used.

Ex. 7

A kneaded product 7 was obtained in the same manner as Ex. 2, except that instead of the fluorinated elastomer (B-1), the thermoplastic heat resistant resin (A-2) was used.

Ex. 8

A kneaded product 8 was obtained in the same manner as Ex. 1, except that instead of the fluorinated elastomer (B-1), the fluorinated elastomer (B-2) was used.

Each of the surface states of the kneaded products obtained in Ex. 1 to 3, 5 and 8, was "A". Each of the surface states of the kneaded products obtained in Ex. 4, 6 and 7, was "B".

The kneaded product obtained in each Ex. was preliminarily dried by heating at 200° C. for 3 hours, and then by using a melt heat press machine (hot press duplex "Model: SA-301" (manufactured by Tester Sangyo Co., Ltd.)), press-molded under conditions of temperature: 370° C., pressure: 10 MPa and press time: 5 minutes, to obtain a press molded product with size: 80 mm×80 mm and thickness: 1.0±0.05 mm.

From the obtained press-molded product, a sample specimen for a flexural modulus evaluation test was obtained, and the flexural modulus was obtained under condition of 23° C.

The results in the respective Ex. are shown in Tables 1 and 2.

Using the kneaded product obtained in each Ex., a hot press molded product by injection molding (a dumbbell specimen by injection molding) was prepared. From the obtained hot press molded product, a sample specimen for an Izod impact strength evaluation test was obtained, whereupon the ordinary temperature Izod impact strength under conditions of 23° C. and the cold Izod impact strength under condition of −40° C. were obtained, respectively.

The results in the respective Ex. are shown in Tables 1 to 3. However, in Ex. 6, 7 and 8, only the ordinary temperature Izod impact strength is shown.

TABLE 1

|  | Ex. 1 | Ex. 2 | Ex. 3 | Ex. 4 | Ex. 5 |
|---|---|---|---|---|---|
| Volume ratio of (A-1) to (B-1) | 90:10 | 80:20 | 70:30 | 50:50 | 100:0 |
| Number average particle diameter of (B-1) [µm] | 7 | 16 | 25 | — | — |
| Surface state of kneaded product | A | A | A | B | A |
| Flexural modulus [MPa] | 3202 | 2677 | 2049 | 1021 | 3865 |
| Ordinary temperature Izod impact strength [J/m] | 39.8 | 39.5 | 41.8 | 36.5 | 32.1 |
| Low temperature Izod impact strength [J/m] | 32.6 | 29.0 | 28.3 | 17.1 | 11.2 |

TABLE 2

|  | Ex. 6 | Ex. 7 |
| --- | --- | --- |
| Volume ratio of (A-1) to (A-2) | 90:10 | 80:20 |
| Surface state of kneaded product | B | B |
| Flexural modulus [MPa] | 3663 | 3438 |
| Ordinary temperature Izod impact strength [J/m] | 18.5 | 26.8 |

TABLE 3

|  | Ex. 8 |
| --- | --- |
| Volume ratio of (A-1) to (B-2) | 90:10 |
| Number average particle diameter of (B-2) [μm] | 5.6 |
| Surface state of kneaded product | A |
| Ordinary temperature Izod impact strength [J/m] | 34.1 |

As shown in Table 1, each of the injection molded products of kneaded products 1 to 3 in Ex. 1 to 3 being fluorinated copolymer compositions of the present invention, had a low flexural modulus, a high Izod impact strength at ordinary temperature and low temperature, and a good surface state.

Further, also the injection molded product of kneaded product 8 in Ex. 8 using the fluorinated elastomer (B-2) instead of the fluorinated elastomer (B-1), had a high Izod impact strength and a good surface state.

On the other hand, the injection molded product of kneaded product 4 in Ex. 4 wherein the content of the fluorinated elastomer was large, while showing a lower flexural modulus, was poor in melt-extrusion moldability and rough in the surface state, whereby it was not possible to satisfy both excellent Izod impact resistance and good surface state of the molded product.

Further, the injection molded product of kneaded product 5 in Ex. 5 containing no fluorinated elastomer, had a high flexural modulus, and the Izod impact strength at ordinary temperature was also inferior to the fluorinated copolymer composition of present invention, and especially the Izod impact strength at low temperature was very low.

Further, the injection molded products of kneaded products 6 and 7 in Ex. 6 and 7 using another thermoplastic heat-resistant resin (A-2) instead of the fluorinated elastomer, were rough in surface states and had a high flexural modulus, and further, the Izod impact strength at ordinary temperature was also inferior to the fluorinated copolymer composition of the present invention.

(Measurement of Dielectric Constant)

Using the above kneaded products 1 to 3 and 5, press-molding was carried out under the conditions described above to obtain a press-molded product with size: 80 mm×80 mm and thickness: 0.3±0.05 mm.

With respect to the press-molded product, the test was carried out by a method in accordance with JIS C2138 (self-balancing bridge method) by using Precision LCR Meter E4980A (manufactured by Agilent Technologies). The test was conducted under a temperature condition of 200° C., by measurement at three points of frequency of 60 Hz, 1 kHz and 1 MHz with n (number of tests)=2. The electrodes used in the test were conductive silver painted ones, and with respect to their sizes, the main electrode diameter was φ36 mm, and the annular electrode inner diameter was φ38 mm. The results in the respective Ex. are shown in Table 4.

(Measurement of Wear Amount)

Using the above kneaded products 1 to 3 and 5, press-molding was carried out under the conditions described above, to obtain a circular pressed sheet with a sample size of φ30 mm and a thickness of 0.2±0.05 mm.

With respect to the press-molded product, the test was carried out by a Matsubara type friction measuring method (cylindrical flat O-ring type) in accordance with JIS K-7218 using a frictional wear tester manufactured by Orientec Co. At room temperature, the test specimen was brought in contact with the mating member ring (material: S45Cs (1.5S), contact area: 2 cm$^2$) under conditions of pressure: 0.8 MPa, rotational speed: 0.5 m/sec. and test time: 1 hour to measure the wear amount of the test specimen. The results in the respective Ex. are shown in Table 4.

TABLE 4

|  |  | Ex. 9 Kneaded product 1 | Ex. 10 Kneaded product 2 | Ex. 11 Kneaded product 3 | Ex. 12 Kneaded product 5 |
| --- | --- | --- | --- | --- | --- |
| Volume ratio of (A-1) to (B-1) |  | 90:10 | 80:20 | 70:30 | 100:0 |
| Dielectric constant | 60 Hz | 3.94 | 3.70 | 3.48 | 4.24 |
|  | 1 kHz | 3.72 | 3.57 | 3.39 | 3.88 |
|  | 1 MHz | 3.55 | 3.46 | 3.31 | 3.61 |
| Wear amount [cm$^3$] |  | 0.00156 | 0.00154 | 0.00007 | 0.0469 |

As shown in Table 4, the molded product of kneaded product 5 in Ex. 12 containing no fluorinated elastomer, had a dielectric constant higher than the fluorinated copolymer compositions of the present invention shown in Ex. 9 to 11, and also had a large wear amount and thus was inferior in wear resistance.

(Measurement of Surface Roughness)

By using a φ30 mm single screw extruder (manufactured by Tanabe Plastics Co., Ltd.) and adjusting each cylinder temperature of the extruder to be from 330 to 370° C. and the T-die temperature to be from 350 to 380° C., the above kneaded product 3 was molded to prepare a film with a thickness of 100 μm±10 and a width of 100 mm. The surface roughness (Ra) of the obtained film was 3.1.

Method of measuring the surface roughness (Ra): By using an ultra deep shape measuring microscope VK-8500, VK-8510 (manufactured by Keyence Corporation) and setting the magnification to be 200-fold and the observation measurement range to be 1,117×1,489.9 (μm), Ra was measured twice in the straight line of 1,117 μm optionally drawn in the range, and the average value was calculated.

From the foregoing, when the fluorinated copolymer composition of the present invention was used, no surface roughness in appearance or no delamination was observed. Further, it has been made apparent that as compared to a thermoplastic heat-resistant resin not containing a fluorinated elastomer, the fluorinated copolymer composition of the present invention has a flexibility as the flexural modulus is reduced, and an impact resistance as the impact strength at ordinary temperature and low temperature is improved. Further, the dielectric constant is low, and the wear resistance is good, and therefore, it is also suitable for an application in which a low dielectric constant is required, such as electronic substrate, or for an application in which a wear resistance is required, such as a sliding member.

INDUSTRIAL APPLICABILITY

The fluorinated copolymer composition of the present invention is excellent in moldability and impact resistance without impairing the heat resistance and mechanical properties, and thus is useful for applications where these characteristics are required, such as a sliding member, etc.

What is claimed is:

1. A fluorinated copolymer composition comprising the following thermoplastic resin A and the following fluorinated elastomer B, wherein
   the fluorinated elastomer B is dispersed in the thermoplastic resin A,
   the number average particle diameter of the fluorinated elastomer B is from 1 to 300 μm, and
   the volume ratio of the thermoplastic resin A to the fluorinated elastomer B is from 97:3 to 55:45, and
   having a flexural modulus of from 1,000 to 3,700 Mpa,
   wherein the thermoplastic resin A is at least one type of melt-moldable thermoplastic heat-resistant resin selected from the group consisting of a polyarylate, a polyether sulfone, a polyaryl sulfone, an aromatic polyamide, an aromatic polyether amide, an aromatic polyether imide, a polyphenylene sulfide, a polyaryl ether ketone, a polyamideimide and a liquid crystal polyester,
   wherein the fluorinated elastomer B is at least one type of fluorinated elastic copolymer selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a perfluoro(alkyl vinyl ether), and the perfluoro(alkyl vinyl ether) is a compound represented by the following formula (I),

$$CF_2=CF(OR^F) \qquad (I)$$

wherein $R^F$ is a $C_{1-8}$ linear or branched perfluoroalkyl group and wherein the fluorinated elastomer B has a Mooney viscosity ($ML_{1+10}$, 121° C.) of from 20 to 200.

2. The fluorinated copolymer composition according to claim 1, wherein the thermoplastic resin A is at least one type of thermoplastic heat resistant resin selected from the group consisting of a polyaryl ether ketone, a polyether sulfone, an aromatic polyether amide and a polyaryl sulfone.

3. The fluorinated copolymer composition according to claim 1, wherein said polyaryl ether ketone is at least one member selected from the group consisting of a polyether ketone, a polyether ether ketone and a polyether ketone ketone.

4. A molded product obtained by molding a molding material comprising the fluorinated copolymer composition as defined in claim 1.

5. A film composed of the molded product as defined in claim 4.

6. The film according to claim 5, which has a surface roughness (Ra) of less than 4.0.

7. A method for producing a film, comprising melt extrusion at a die temperature of from 350 to 420° C. to produce the film as defined in claim 5.

8. The molded product according to claim 4, which is used as a sliding member.

9. The molded product according to claim 4, which is a sealing member, a gear, an actuator, a piston, a bearing, a housing, an aircraft interior material, a fuel tube or a bushing.

10. An injection molded product obtained by injection molding a molding material comprising the fluorinated copolymer composition as defined in claim 1.

11. The injection molded product according to claim 10, which is used as a sliding member.

12. The injection molded product according to claim 10, which is a sealing member, a gear, an actuator, a piston, a bearing, a housing, an aircraft interior material, a fuel tube or a bushing.

13. A prepreg comprising the fluorinated copolymer composition as defined in claim 1 and reinforcing fibers.

14. A fiber-reinforced molded product using the prepreg as defined in claim 13.

15. The fluorinated copolymer composition according to claim 1, wherein the thermoplastic resin A and the fluorinated elastomer B are in the fluorinated copolymer composition in a volume ratio (A:B) of 90:10 to 55:45.

16. A method for producing a fluorinated copolymer composition, comprising melt-kneading the following thermoplastic resin A and the following fluorinated elastomer B in a volume ratio of from 97:3 to 55:45, wherein
   the melt-kneading is conducted, substantially in the absence of a crosslinking agent and crosslinking aid, so that the fluorinated elastomer B become particles having a number average particle diameter of from 1 to 300 nm, which are dispersed in the thermoplastic resin A,
   wherein the thermoplastic resin A is at least one type of melt-moldable thermoplastic heat resistant resin selected from the group consisting of a polyarylate, a polyether sulfone, a polyaryl sulfone, an aromatic polyamide, an aromatic polyether amide, a polyphenylene sulfide, a polyaryl ether ketone, a polyamideimide and a liquid crystal polyester,
   wherein the fluorinated elastomer B is at least one type of fluorinated copolymer selected from the group consisting of a copolymer having units based on tetrafluoroethylene and units based on propylene, a copolymer having units based on hexafluoropropylene and units based on vinylidene fluoride, and a copolymer having units based on tetrafluoroethylene and units based on a perfluoro(alkyl vinyl ether), and the perfluoro(alkyl vinyl ether) is a compound represented by the following formula (I),

$$CF_2=CF(OR^F) \qquad (I)$$

wherein $R^F$ is a $C_{1-8}$ linear or branched perfluoroalkyl group and wherein the fluorinated elastomer B has a Mooney viscosity ($ML_{1+10}$, 121° C.) of from 20 to 200.

17. The method for producing a fluorinated copolymer composition according to claim 16, wherein the thermoplastic resin A is at least one type of thermoplastic heat resistant resin selected from the group consisting of a polyaryl ether ketone, a polyether sulfone, an aromatic polyether amide and a polyaryl sulfone.

18. The method for producing a fluorinated copolymer composition according to claim 16, wherein said polyaryl ether ketone is at least one member selected from the group consisting of a polyether ketone, a polyether ether ketone and a polyether ketone ketone.

19. The method for producing a fluorinated copolymer composition according to claim 16, wherein the melt-kneading is conducted under conditions of a kneading temperature of from 220 to 480° C., an extrusion shear rate of from 3 to 2,500 s$^{-1}$ and a residence time in the extruder of from 10 to 290 seconds.

* * * * *